United States Patent
Moireau et al.

(10) Patent No.: US 6,322,888 B1
(45) Date of Patent: Nov. 27, 2001

(54) METHOD FOR PRODUCING SIZED GLASS FIBERS AND RESULTING PRODUCTS

(75) Inventors: Patrick Moireau, Curienne; Bruno Gibello; Marc Roubin, both of Chambery, all of (FR)

(73) Assignee: Vetrotex France, Chambery (FR)

( * ) Notice: Subject to any disclaimer, the term of this patent is extended or adjusted under 35 U.S.C. 154(b) by 0 days.

(21) Appl. No.: 09/147,519

(22) PCT Filed: May 14, 1998

(86) PCT No.: PCT/FR98/00953

§ 371 Date: Sep. 3, 1999

§ 102(e) Date: Sep. 3, 1999

(87) PCT Pub. No.: WO98/51633

PCT Pub. Date: Nov. 19, 1998

(30) Foreign Application Priority Data

May 14, 1997 (FR) .................................................. 97 05926

(51) Int. Cl.[7] .............................. D02G 3/00; C03B 37/10
(52) U.S. Cl. ........................... 428/378; 428/392; 65/432; 65/433; 65/447; 65/448; 65/450; 65/453
(58) Field of Search ..................................... 427/292, 346; 156/62.2; 428/392, 378; 65/432, 443, 447, 448, 450, 453

(56) References Cited

U.S. PATENT DOCUMENTS

| 3,505,279 | 4/1970 | Preston et al. . |
|---|---|---|
| 4,198,121 | 4/1980 | Le Davay et al. . |
| 4,867,775 | 9/1989 | Cain et al. . |
| 5,352,392 | 10/1994 | Johnson et al. . |
| 5,486,416 | 1/1996 | Johnson et al. . |
| 5,601,882 | 2/1997 | Augier et al. . |
| 5,611,836 | 3/1997 | Moireau . |
| 5,698,000 | 12/1997 | Moireau et al. . |
| 5,789,074 | 8/1998 | Moireau et al. . |

FOREIGN PATENT DOCUMENTS

| 2 279 120 | 2/1976 | (FR) . |
|---|---|---|
| WO 9618683 | 6/1996 | (WO) . |

*Primary Examiner*—Cynthia H. Kelly
*Assistant Examiner*—J. M. Gray
(74) *Attorney, Agent, or Firm*—Oblon, Spivak, McClelland, Maier & Neustadt, P.C.

(57) ABSTRACT

A process for producing sized glass yarns, which entails:
  a) drawing streams of molten glass from orifices located at a bottom of one or more dies, in a form of one or more fans of continuous filaments,
  b) assembling the filaments into one or more moving supports,
wherein a first stable composition having a viscosity of between 0.5 and 250 cP is deposited onto the surface of the continuous filaments, and a second stable composition, supplied separately from the first and having a viscosity of between 0.5 and 300 cP, is deposited onto the surface of the filaments of the yarns, at the earliest during deposition of the first composition and at the latest during collection of the years, the difference in viscosity between the two compositions deposited being less than 150 cP, the mixture of the deposited compositions functioning as a sizing composition and being polymerizable at room temperature.

17 Claims, No Drawings

METHOD FOR PRODUCING SIZED GLASS FIBERS AND RESULTING PRODUCTS

BACKGROUND OF THE INVENTION

1. Field of the Invention

In the field of reinforcing yarns and composites, the present invention relates to a process for the production of sized glass yarns, as well as to the yarns obtained and to the composites made from the said yarns.

2. Description of the Background

Reinforcing glass yarns are manufactured, in a known manner, from molten glass streams flowing through die orifices. These streams are drawn in the form of continuous filaments and these filaments are then assembled as base yarns, which are then collected.

Before being assembled in the form of yarns, the filaments are usually coated with a sizing composition by passing them through a sizing member. This deposition of sizing is very important: on the one hand, it allows the yarns to be obtained and, on the other hand, it allows these yarns to be used efficiently in the production of composites. Sizing has indeed the following usual functions: it protects the yarns from abrasion and thus prevents them from breaking during their manufacture and, possibly, during their use; it furthermore allows the combination of yarns with organic and/or inorganic materials, by facilitating, in particular, the wetting and/or impregnation of the yarns by these materials. In most cases, sizing also enhances the adhesion between the glass and the material to be reinforced and allows composites to be obtained with improved mechanical properties.

It is thus important for the deposition of sizing to be carried out efficiently and under the best possible conditions, so that the sizing can carry out its functions correctly.

The sizings most commonly used are aqueous sizings (containing more than 85% by weight of water) which are easy to deposit, the water then being removed by drying. Sizing compositions are normally chosen so as not to undergo chemical reactions at room temperature (during storage) and under the die (for example polymerization of the sizing, thereby making it impossible to deposit). On the other hand, they can optionally be chosen to polymerize under the effect of a treatment subsequent to the deposition on the filaments. This is, in general, a heat treatment at a temperature above 100° C., carried out after collecting the yarns. This polymerization of the sizing makes it possible to obtain integral yarns (whose filaments are solidly attached to each other) and which can be manipulated, this integrity being especially desired in textile applications in which the yarns are subjected to high mechanical stresses.

Since each additional treatment of the sized yarns, in particular each energy-consuming treatment, results in additional cost with regard to the yarn manufacturing process and is liable to generate defects on the yarns obtained (problems of migration of the components of the sizing on a winding of heat-treated yarns, for example), it is economically advantageous to find means for reducing the importance or number of these treatments.

However, no process currently exists which is both very cost-effective (especially insofar as it does not require an expensive energy treatment of the sized yarns during their manufacture) and which makes it possible to obtain, in good yields (in particular at high rates, with a limited level of breakage and with no variation in the quality of the yarns which would necessitate rejection of some of the products), an entire range of sized yarns for various applications, these sized yarns having uniform coating and characteristics over their entire length.

SUMMARY OF THE INVENTION

The object of the present invention is thus to provide a process for the production of sized glass yarns of constant quality in favourable yield, this process being both cost-effective and affording the best possible yarn-coating conditions. The object of the present invention is also to provide a process which makes it possible to obtain, with these same advantages, an entire range of glass yarns which can be used in various applications. The object of the present invention is also to obtain yarns which can be manipulated directly and which can be used to prepare composites and which have a uniform coating over their entire length.

DETAILED DESCRIPTION OF THE PREFERRED EMBODIMENTS

This object is achieved by the process according to the invention, in which the conditions necessary for obtaining the desired yarns with the advantages described above are defined. In this process, streams of molten glass are drawn, these streams coming from orifices located at the bottom of one or more dies, in the form of one or more fans (or sheets) of continuous filaments, and the filaments are then assembled into one or more yarns which are collected on one or more moving support(s), this process consisting in depositing a first stable composition, having a viscosity of between 0.5 and 250 cP, onto the surface of the filaments, in depositing at least a second stable composition, supplied separately of the first and having a viscosity of between 0.5 and 300 cP, onto the surface of the filaments or of the yarn(s), at the very earliest during the deposition of the first composition and at the very latest during the collection of the yarn(s), the difference in viscosity between the compositions deposited being less than 150 cP, the mixture of the compositions deposited furthermore having the functions of a sizing composition and being capable of polymerizing at room temperature.

The process according to the invention has several advantages: firstly, it makes it possible to dispense with the treatments (heat treatments or irradiation) usually used to polymerize sizing compositions on glass yarns, which represents a considerable economy. In the same way, it avoids the treatment of certain effluents, the release of effluents generally being associated with the polymerization heat treatments carried out. The process according to the invention is of improved production efficiency, the yarns obtained especially being of uniform quality over their entire length. Furthermore, it allows better control over the sizing polymerization reactions carried out on the yarns and limits the risks of these yarns breaking. This process also reduces the risks of irregular migration of sizing components on the yarn and/or the risks of coloration of the yarns or of deformation of the windings associated with certain yarn treatments (such as drying). Moreover, the process can be applied with the same advantages to the preparation of different types of sized yarns for the purpose of various applications. It also makes it possible to obtain yarns coated with novel compositions, based on systems not existing in current sizings on account of their reactivity and instability. The process according to the invention thus makes it possible to broaden considerably the field of sizings and opens the way to novel products and novel applications.

According to the invention, the term "glass yarns" is understood to refer to yarns based on glass, i.e. not only yarns formed solely of glass filaments but also yarns formed of glass filaments and of organic filaments, in particular thermoplastic filaments. In the latter case, during the drawing of the glass filaments, the organic filaments are extruded and entrained simultaneously (or the organic yarns coming, for example, from windings are supplied simultaneously), the paths followed by the glass filaments and the organic filaments (or yarns) converging on one another before the said filaments are assembled into at least one mechanically-entrained composite yarn.

The glass filaments can be drawn in the form of a fan from a die or in the form of several fans from one or more dies and can be assembled into one or more yarns. The draw rate of the glass filaments in the process according to the invention is generally between 8 and 75 m/s, usually between 10 and 60 m/s. In general and preferably according to the invention, the compositions (in particular the first composition) are deposited on the filaments once cooled below 90° C., that is to say when the temperature of these filaments is below 90° C., advantageously below 75° C., in order to avoid any risk of selective evaporation of components of the compositions deposited and to afford better control over what is deposited on the filaments.

Optionally, the cooling of the filaments can be accelerated using a device for spraying a coolant fluid. If necessary, this fluid can be removed before the first composition is deposited.

The first composition is deposited during the drawing, at the very latest when the filaments are assembled into yarn(s) and preferably before the filaments are assembled into yarn(s), so as to avoid any breakage of the filaments rubbing against the assembly member and in order to obtain distribution of the first composition over all of the filaments. The coating can be carried out, for example, using a roller, using a sprayer, using a device which also acts as an assembly member, etc. or can also be carried out by means of other yarns or filaments coated with the first composition and placed in contact with the glass yarns in the case, for example, of the preparation of composite yarns.

Preferably, the second composition is also deposited on the filaments at the very latest during assembly of the filaments into yarns. This composition can also be deposited using a roller, using a sprayer, using a device which also acts as an assembly member, etc. or can be carried out by means of other yarns or filaments coated with this composition and placed in contact with the glass filaments, in which case the first composition is preferably deposited directly on the glass filaments at least, before being combined with the other yarns or filaments.

According to the invention, the expression "at the very earliest during the deposition of the first composition" is understood to mean that the compositions are mixed immediately before (within a few seconds or even in the second preceding the deposition) their joint deposition onto the filaments or are mixed onto the filaments or yarn(s). In the latter case, each composition is generally deposited on the filaments or yarn(s) using a deposition means which is specific for it or which is its own (at least two separate deposition means being necessary in this case, these two means being placed on the same side of the filaments or yarn(s) or on either side of the filaments or yarn(s)) and the compositions are mixed by interdiffusion (diffusion of the compositions into each other) at the surface of the filaments. It can also be advantageous to use only one device to deposit the two compositions, the two compositions then being supplied separately and being mixed, in this case, in the device, optionally on the filaments, or even immediately before (within a few seconds or even in the second before) introduction into the deposition device. This single deposition device can be a remote-application device (sprayer) or a contact device, the latter type of device having the advantage of allowing better control over the amounts deposited onto the filaments. In the latter case, it is important for the compositions to be fully deposited on the filaments after they have been placed in contact in the device, this being made possible especially by the choice of the amounts of composition deposited (these amounts being specified later in a preferred embodiment of the invention).

It is clear that the present invention is described on the basis of the deposition of two separate compositions, but it also applies in the case of the deposition of a larger number of compositions. In this case, each additional composition is preferably defined on the model of the second composition, i.e. each composition is stable and supplied separately, each additional composition has a viscosity of between 0.5 and 300 cP and each additional composition is deposited at the very earliest during the deposition of the first composition and at the very latest during the collection of the yarn(s). Furthermore, in accordance with the general definition, the difference in viscosity between the compositions (for example between the first and each of the subsequent compositions deposited before collection) must be less than 150 cP, the mixture of the compositions also having the functions of a sizing composition and being capable of polymerizing at room temperature. It is worth pointing out, in this respect, that, in the general definition, the "mixture of the compositions" refers to the mixture of all of the compositions deposited on the yarn(s) before the end of the collection step (and not necessarily to the mixture of the first two compositions deposited in the case of the deposition of a number of compositions which is greater than two).

The term "stable composition" is understood to refer mainly to a "composition which does not polymerize without supplying at least one other component", it being possible in many cases for this composition to be stored for many days, at storage temperatures which can be up to 40 or 50° C.

Each of the compositions deposited can be chosen from compositions which are aqueous, anhydrous or which have a low content of solvent. Preferably, compositions comprising less than 5% by weight of solvent (i.e. of compounds acting solely as solvent), or even totally free of solvent, are used. The optional solvents are essentially organic solvents required to dissolve certain compounds. The absence or the limited presence of solvents makes it possible to avoid all the problems associated with the presence of water (drying problems) or of organic solvents (problems of toxicity of the solvents in particular) on the yarns. The compositions are generally in the form of at least partially miscible and preferably miscible solutions (it is possible, however, for certain specific applications, for at least one of the compositions forming the mixture to be in the form of a dispersion—emulsion, suspension—or not to be miscible with one or other of the compositions forming the mixture).

The viscosity of the compositions is essential in order to guarantee good deposition of the compositions, and most particularly the difference in viscosity between the compositions. If the difference in viscosity exceeds 150 cP, the yarns obtained have an insufficiently uniform coating. Preferably and as a general rule, if the difference in viscosity is large, the first composition deposited has the lowest viscosity among the compositions deposited. The difference in viscosity is preferably less than 135 cP and can be zero. The difference in viscosity is preferably proportionately lower the less miscible the compositions mixed together. The viscosity is estimated at the composition deposition temperature, this temperature generally being between 20 and 70° C., and usually between 30 and 60° C.

Preferably, the first composition has a viscosity (at the time of deposition) of between 1 and 200 cP (in a particularly preferred manner between 1 and 150 cP) and the second composition (or the subsequent ones) has(have) a viscosity (at the time of deposition) of between 1 and 250 cP (in a particularly preferred manner between 1 and 200 cP). Preferably, when one or more of the compositions used has(have) a solvent content of less than 5%, the viscosity of this(these) composition(s) is between 10 and 250 cP (preferably between 20 and 150 cP) for the first composition and between 10 and 300 cP (preferably between 20 and 200 cP) for the subsequent compositions. In the case of the use of one or more aqueous compositions, the viscosity is between 1 and 25 cP for the first composition and is between 1 and 50 cP for the subsequent compositions.

The amount of compositions deposited is also, in many cases, an important factor in combination with the other characteristics of the process according to the invention. By keeping to the amounts indicated below, it is possible in particular, in certain cases, to avoid an uncontrolled and/or possibly non-uniform polymerization of the mixture on the yarns and to avoid phenomena of pollution of the composition deposition means by another composition when contact-deposition devices placed one after the other are used, these phenomena leading in particular to breaking of the yarns (such phenomena being proportionately larger in magnitude the higher the draw rate, and being inavoidable at larger amounts when, for example, it is desired to make prepregs directly). Thus, preferably and as a general rule according to the invention, the amount of each composition deposited represents, by weight, excluding solvent (i.e. if possible solvents are removed), from 0.1 to 2% of the weight of the filaments, in a particularly preferred manner from 0.2 to 1.5% of the weight of the filaments. Also preferably, the loss on ignition of the yarns obtained (coated with the assembly of compositions) is less than 3% by weight.

As a general rule, when one (or more) composition(s) containing less than 5% by weight of solvent is(are) used, the amount of this(these) composition(s) (solvent(s) included) deposited on the filaments is approximately between 0.1 and 2% by weight of the filaments, and in the case of one or more aqueous compositions, the amount of this(these) composition(s) (solvent(s) included) is, rather, between 1 and 15% by weight of the filaments.

When the mixture coating the yarns according to the invention consists solely of a first composition and of a second composition, the ratio of the two amounts by weight of each of these compositions on the filaments or yarns (the possible solvent(s) being taken into account in this case to evaluate the amount) is also, preferably, between 1/10 and 10 (i.e. the first composition represents approximately from 9 to 91% by weight of the mixture deposited on the filaments). In a particularly preferred manner, mainly in the case in which the compositions contain less than 5% by weight of solvent, this ratio is between 1/3 and 3 (i.e. the first composition represents from 25 to 75% by weight of the mixture deposited on the filaments) to allow good interdiffusion of the compositions with each other. More generally, irrespective of the number of compositions deposited on the filaments, these compositions are preferably deposited in similar amounts to each other.

The compositions are chosen so as to polymerize, after they have been mixed together, on the filaments or yarns and are preferably chosen such that the polymerization of the mixture at room temperature takes place to at least 80% (i.e. to at least 80% of the expected conversion rate) in less than 80 hours, and preferably in less than 50 hours, after deposition and mixing of the compositions, in particular after deposition and mixing of the reactive compositions (comprising component(s) liable to be involved in the polymerization reaction of the mixture), on the filaments. The yarns thus obtained are easy to manipulate and pose no problems of subsequent implementation.

In the present invention, the terms "polymerization", "polymerize" etc. are understood to mean "polymerization and/or crosslinking", "polymerize and/or crosslink", etc. As well, the terms "mixture capable of polymerizing" or "compositions chosen so as to polymerize after they have been mixed together" are understood to mean that the mixture or the compositions comprise(s) constituent(s) capable of polymerising in the mixing and the terms <<polymerization of the mixture>> are understood to mean polymerization of this (these) constituent(s) capable of polymerising in the mixing and not necessarily polymerization of all the constituents of the mixing. Moreover, the term "room temperature" also means, in the process according to the invention, "without any additional supply of energy" and covers a temperature range below 60° C., generally from 15 to 45° C.

Polymerization of the mixture is initiated at the very earliest during the mixing of at least two reactive compositions, and at the very latest during the collection of the yarns.

The compositions are also chosen such that their mixture has the characteristics and functions essential of a sizing composition (protection of the yarns against abrasion, enhancement of the wetting and/or impregnation of the yarns by the material to be reinforced and/or of the adhesion of glass to this material, etc.). The "mixture" formed of at least two compositions mentioned in the present invention can thus also be denoted by the term "sizing composition".

The mixture of compositions present on the sized yarns comprises at least one base system which is polymerizable at room temperature. According to the invention, the terms "mixture comprising" and "composition comprising" are understood to refer to the "mixture (or composition, respectively) one of whose initial constituents is . . . ", independently of the evolution of this constituent within the mixture (or the composition, respectively). The term "base system" is understood to refer to the compound(s) which is(are) essential for the sizing and which is(are) capable of polymerizing in the sizing, this(these) compound(s) forming part of the structure of the polymerized sizing. As a general rule, the base system represents at least 40%, generally at least 55%, and in many cases at least 60% (or even at least 65%) by weight of the "solids" of the mixture (or of the mixture from which the possible solvent(s) has(have) been removed). The base system can be up to 100% by weight but generally doesn't exceed 95% by weight, and in many cases 90% by weight (or even 85% by weight) of the solids of the mixture. The proportion of the base system generally increases as the desired integrity increases.

The base system comprises at least one group of component(s) capable of homopolymerizing at room temperature and/or comprises at least two groups of component (s), the components of the two groups being capable of copolymerizing at room temperature. According to the invention, the expression "group of component(s)" is understood by extension to refer to one or more components of the same reactivity. The term "same reactivity" is understood to mean "the same ability to polymerize with or in the presence of certain components (of the mixture) or of certain functions (of (a) component(s) of the mixture). The components of the same reactivity can be subdivided into one or more subgroups, the component(s) of each subgroup having at least one reactive function (capable of taking part in the polymerization reaction of the mixture) in common.

Preferably, the base system mainly comprises a group of component(s) capable of homopolymerizing at room temperature or two groups of component(s) capable of polymerizing (homopolymerizing or copolymerizing) at room temperature, this(these) group(s) representing at least 60% by weight, preferably at least 80% by weight and up to 100% by weight in most cases, of the base system.

Preferably, the base system comprises at least two groups of component(s) (capable of homopolymerizing or of copolymerizing), the two groups being derived respectively from different compositions deposited on the yarn.

Moreover, in a preferred manner according to the invention, mainly in the case in which the mixture comprises less than 5% by weight of solvent, the base system comprises at least 60% by weight (in a particularly preferred manner at least 75% by weight and up to 100% by weight in most cases) of component(s) with a molecular mass of less than 750 (in a particularly preferred manner less than 500). In most cases according to the invention, and in a preferred manner, these components with a molecular mass of less than 750 are monomers (mono- or polyfunctional monomers), but the base system can also comprise one (or more) component(s) with a molecular mass of less than 750 in the form of oligomer(s) or polymer(s) containing partially polymerized functions.

According to one embodiment of the invention, the mixture of compositions deposited on the filaments comprises, in addition to the base system, at least one catalyst (or accelerator or initiator) which promotes the polymerization of all or part of the component(s) of the base system. The amount of catalyst(s) in the mixture of the compositions is generally less than 5% by weight of the mixture, and is preferably less than 3% by weight of the mixture.

As a general rule, each reactive component of the mixture is supplied by a composition different from the one (those) supplying the component(s) capable of reacting with the said component or giving rise to the reaction of the said component. It is possible, however, to envisage supplying, in the same composition, components which react together or part of which react together in the presence of the other part, if one part of the components is blocked so as to prevent the spontaneous reaction. In this case, at least one deblocking agent which allows the polymerization reaction to be triggered is supplied to another composition.

Advantageously, a majority of component(s) (at least 50%) of the base system supplied by one of the reactive compositions is at least partially miscible with the composition(s) comprising the component(s) which polymerize with this(these) component(s) and/or which promote the polymerization of this(these) component(s).

According to a preferred embodiment of the present invention, the mixture comprises at least one base system, this system comprising at least a first group of component(s) capable of homopolymerizing at room temperature and at least a second group of component(s) capable of homopolymerizing at room temperature, the mixture also comprising at least a first initiator which promotes the homopolymerization of the components of the first group and at least a second initiator which promotes the homopolymerization of the components of the second group. The first group of component(s) is supplied by at least one of the compositions, for example the first composition, and the second group of component(s) is preferably supplied by one or more compositions different from that(those) supplying the first group, for example supplied by the second composition. Similarly, the first initiator is preferably supplied by one or more compositions which are different from that(those) supplying the first group, for example supplied by the second composition, and the second initiator is preferably supplied by one or more compositions which are different from that(those) supplying the second group, for example supplied by the first composition.

By way of non-exhaustive example, the first group can consist, in the above embodiment, of one or more components chosen from components having at least one epoxy reactive function, the second group can consist of one or more components chosen from components having at least one (meth)acrylic reactive function, the first initiator can consist of one or more components chosen from Lewis acids and Lewis bases and the second initiator can consist of one or more peroxides, the components (and their initiators) being chosen reactive enough in order to allow polymerization at room temperature.

According to another particularly preferred embodiment of the present invention, the mixture comprises at least one base system, this system comprising at least a first group of component(s) and at least a second group of component(s) capable of copolymerizing at room temperature with the component(s) of the first group. The first group of component(s) is supplied by at least one of the compositions, for example the first composition, and the second group of component(s) is preferably supplied by one or more compositions different from that(those) supplying the first group, for example supplied by the second composition. Optionally, the mixture also comprises at least one catalyst or initiator which promotes the copolymerization reaction, this catalyst being supplied by any one of the compositions.

By way of non-exhausting example, the first group can consist, in the above embodiment, of one or more components chosen from components having at least one epoxy reactive function, and the second group can consist of one or more components chosen from components having at least one amine reactive function or from components having at least one anhydride reactive function, it being possible for the optional catalyst(s) to be chosen in particular from tertiary amines, the components being chosen reactive enough in order to allow polymerization at room temperature.

The choice of the component(s) of the base system and the amount of this(these) component(s) depends in particular on the organic material which needs to be reinforced by the yarns according to the invention and on the application envisaged. In the case especially in which the base system of the mixture comprises at least a first and a second group of component(s) capable of copolymerizing, the respective amounts of these groups are chosen as a function of the desired polymerization (it may be advantageous, for example, to have an excess of component(s) of one of the groups in order to keep certain reactive functions free after polymerization for the purpose of combining them with certain organic materials). It is thus possible to obtain yarns coated with a sizing composition which is partially or fully polymerized. The process according to the invention allows, in this respect, better control of the polymerization processes than processes which use a polymerization heat treatment, since heat treatments promote the appearance of parasitic reactions (for example uncontrolled and generally undesired oxidation-type reactions).

Besides the component(s) essentially forming part of the polymerized sizing structure and the optional catalyst(s), the mixture deposited on the yarns according to the invention can comprise one or more components which do not polymerize in the mixing but which are capable of polymerizing with one or more components of a material (or matrix) destined to be reinforced by the yarns coated with the mixing, or can comprise one or more components (denoted hereinbelow as additives) supplied by one and/or other of the compositions and imparting specific properties to the mixture.

In particular, the mixture preferably comprises one or more coupling agents, as component(s) of the base system for the coupling agent(s) involved in the polymerization reaction and/or solely as additive(s) for the coupling agent(s) not involved in the polymerization reaction. The proportion of the coupling agent(s) is between 0 and 25% by weight of the mixture, and preferably between 5 and 20% by weight of the mixture. These coupling agents are generally required for the mixture to have the functions of a sizing composition. They can be chosen, for example, from the following components: silanes such as gamma-glycidoxypropyltrimethoxysilane, gamma-methacryloxypropyltrimethoxysilane, polyethoxylated-propoxylated trimethoxysilane, gamma-acryloxypropyltrimethoxysilane, vinyltrimethoxysilane, phenylaminopropyltrimethoxysilane, styrylaminoethylaminopropyltrimethoxysilane, aminopropyltriethoxysilane, tert-butylcarbamoylpropyltrimethoxysilane, etc.; titanates, zirconates, siloxanes, etc.

The mixture can also comprise, generally as additive not involved in the polymerization reaction, at least one textile implementation agent acting essentially as a lubricant, in proportions of between 0 and 25% by weight of the mixture, and preferably less than or equal to 20% by weight. Lubricant textile agents are necessary in many cases for the mixture to have the functions of a sizing composition. They can be chosen, for example, from the following components: fatty esters, glycol derivatives (in particular ethylene glycol or propylene glycol derivatives), such as an isopropyl or cetyl palmitate, an isobutyl stearate, a decyl laurate, an ethylene glycol adipate, a polyethylene glycol or a polypropylene glycol with a molecular weight of less than 2000, an isopropyl stearate, etc.

The mixture can also comprise at least one film-forming agent generally acting as a slip agent and facilitating the fiber-forming, in proportions of between 0 and 10% by weight of the mixture, and preferably less than or equal to 5% by weight. The presence of this(these) agent(s) prevents any appreciable rubbing of the filaments (for example on sizing devices) when the filaments are drawn at a high rate—more than 40 m/s—and/or when they are very thin, these agents, however, being expensive and possibly resulting in a decrease in the mechanical properties of the composites. The film-forming agents can be chosen, for example, from the following components: silicones, siloxanes or polysiloxanes such as glycidyl(n) polydimethylsiloxane, alpha-omega-acryloxypolydimethylsiloxane, etc., silicone derivatives such as silicone oil, etc.

The mixture can also comprise at least one agent for adaptation to the materials to be reinforced, in the case of cement materials in particular.

The glass yarns obtained according to the process of the present invention are coated with a sizing composition comprising at least one base system which is polymerizable at room temperature, this base system comprising at least one group of component(s) capable of homopolymerizing at room temperature and/or comprising at least two groups of component(s), the components of the two groups being capable of copolymerizing at room temperature, the sizing composition also comprising, if necessary, at least one catalyst and/or at least one deblocking agent which is(are) capable of triggering the polymerization reaction.

As indicated above, the yarns obtained have a coating which is partially or fully polymerized, this coating generally being uniform over its entire thickness. In certain very specific cases and with suitable deposition means, it is possible, however, to envisage having a polymerization only on a certain thickness of this coating (for example at the interface of the two compositions deposited).

These yarns are generally collected in the form of windings on rotating supports. Irrespective of the speed of the polymerization reaction, absence of excessive sticking together of the yarns on the windings is generally observed, this being the case even for low crossing angles of less than 1.5°. The yarns obtained according to the invention are easy to unwind from windings and are easy to manipulate.

The yarns can also be collected on receiver supports moving in translation. They can, in fact, be projected by a member which also serves to draw them, towards the collection surface which moves transversely to the direction of the projected yarns, in order to obtain a sheet of interwoven continuous yarns known as a "mat". They can also be chopped before collection by a member which also serves to draw them.

The yarns obtained according to the invention can thus be in different forms after collection, in particular in the form of bobbins of continuous yarns (roving, cakes, cops, etc.), in the form of chopped yarns, they can be assembled in the form of braiding, slivers, mats or networks, which may or may not be woven, etc. The glass filaments forming these yarns can have a diameter of between 5 and 30 microns and the glass used to make these filaments can be any type of glass known for the preparation of reinforcing yarns: E glass, AR (alkali-resistant) glass, etc.

The yarns according to the invention can advantageously be combined with various materials to be reinforced in order to make composite articles with good mechanical properties. The composites are advantageously obtained by combining at least some glass yarns according to the invention and at least one organic and/or inorganic material, the glass content within these composites being generally between 30 and 75% by weight.

The examples which follow illustrate the present invention without, however, limiting it.

EXAMPLE 1

Filaments 14 microns in diameter, obtained by drawing molten glass streams, are coated with the following first stable composition, expressed as a weight percentage relative to the mixture of the first and second compositions deposited:

Components (first group) of the base system with a molecular mass of less than 750:

| | |
|---|---|
| • trimethylolpropane triglycidyl ether[1] | 20.0% |
| • diglycidyl ether of cyclohexanedimethanol[2] | 15.0% |
| • cresyl glycidyl ether[3] | 18.0% |

The viscosity of this composition (as well as of the following compositions) is measured on a Sofraser-type machine (Mivi 4000) sold by the company Sofraser.

The viscosity obtained for this composition is 44 cP at 20° C. (which corresponds to a viscosity of about 15 to 30 cP at the deposition temperature, which is about 40 to 60° C. in this example).

The filaments are then coated with the following second stable composition, expressed as a weight percentage relative to the mixture of the first and second compositions deposited:
Components (second group) of the base system with a molecular mass of less than 750:

| | |
|---|---|
| • isophorone diamine | 20.5% |
| Catalyst: | |
| • organometallic amine[4] | 0.5% |
| Additives:. | |
| • lubricant textile agent based on fatty acid esters and surfactants[5] | 10.0% |
| • gamma-methacryloxypropyltrimethoxysilane coupling agent[6] | 8.0% |
| • 3-4,5-dihydroxyimidazol-1-yl-(propyltriethoxysilane) coupling agent[7] | 8.0% |

This composition has a viscosity of 58 cP at 20° C. (which corresponds to a viscosity of about 13 to 25 cP at the deposition temperature of about 40 to 60° C.). The filaments are then assembled into yarns, which are wound in the form of rovings. The yarns obtained have a yarn count (linear mass) of 300 tex (g/km) approximately and a loss on ignition of 0.6%.

The yarns obtained are easy to manipulate and have a uniform coating over their entire length, polymerization (in the present case this is a copolymerization) being carried out over approximately 18 h after mixing together the compositions on the filaments. These yarns have good abrasion resistance and allow organic materials to be reinforced efficiently.

EXAMPLE 2

Filaments 14 microns in diameter, obtained by drawing molten glass streams, are coated with the following first stable composition (weight percentages relative to the mixture of the first and second compositions):
Components (first group) of the base system with a molecular mass of less than 750:

| | |
|---|---|
| • diglycidyl ether of cyclohexanedimethanol[2] | 18.0% |
| • cresyl glycidyl ether[3] | 18.0% |
| • gamma-glycidoxypropyltrimethoxysilane coupling agent[9] | 10.0% |
| Catalyst (for the second group): | |
| • dibenzoyl peroxide[8] | 4.0% |

This composition has a viscosity of 32 cP at 20° C. (which corresponds to a viscosity of about 15 to 25 cP at the deposition temperature of about 40 to 60° C.).

The filaments are then coated with the following second stable composition (weight percentages relative to the mixture of the first and second compositions):
Components (second group) of the base system with a molecular mass of less than 750:

| | |
|---|---|
| • ethoxylated trimethylolpropane triacrylate[10] | 15.0% |
| • hexanediol diacrylate[11] | 16.0% |
| • gamma-methacryloxypropyltrimethoxysilane coupling agent[6] | 10.0% |

Components (third group) of the base system with a molecular mass of less than 750 and catalyst (for the first group):

| | |
|---|---|
| • 2-(4,6-dimethylaminomethyl)phenol[12] | 9.0% |

This composition has a viscosity of 24 cP at 20° C. (which corresponds to a viscosity of about 12 to 20 cP at the deposition temperature of about 40 to 60° C.). The filaments are then assembled into yarns, which are wound in the form of rovings. The yarns obtained have a yarn count of about 150 tex and a loss on ignition of 0.5%.

The yarns obtained are easy to manipulate and have a uniform coating over their entire length, polymerization (in the present case this is a copolymerization and crossed homopolymerizations) being carried out over about 72 h after mixing together the compositions on the filaments.

These yarns are extracted from the packages in order to measure their abrasion resistance. This resistance is evaluated by weighing the amount of flock formed after passing the yarns over a series of lifting rods. For different yarns obtained according to the present invention, the amount of flock weighed is about 1 mg of flock per kg of yarn tested. This shows that the yarns obtained have good abrasion resistance.

The tensile breaking force and tenacity of the yarns obtained are also measured under the conditions defined by ISO standard 3341. The tensile breaking force measured on 8 to 10 test pieces is about 5 kgf (standard deviation of 0.4 kgf) and the tensile breaking tenacity is about 34 g/tex (standard deviation of 3 g/tex). These yarns allow organic materials to be reinforced effectively.

EXAMPLE 3

Filaments 14 microns in diameter, obtained by drawing molten glass streams, are coated with the following first stable composition (weight percentages relative to the mixture of the first and second compositions):
Components (first group) of the base system with a molecular mass of less than 750:

| | |
|---|---|
| • trimethylolpropane triglycidyl ether[1] | 30.0% |
| • diglycidyl ether of 1,4-butanediol[13] | 15.0% |
| • $(C_{12}-C_{14})$alkyl monoglycidyl ether[14] | 15.0% |

This composition has a viscosity of 68 cP at 20° C. (which corresponds to a viscosity of about 20 to 40 cP at the deposition temperature of about 40 to 60° C.).

The filaments are then coated with the following second stable composition (weight percentages relative to the mixture of the first and second compositions):
Components (second group) of the base system with a molecular mass of less than 750:

| • trimethoxysilylpropylaminopropyltrimethoxysilane coupling agent[15] | 10.0% |
| • mixture of benzene-1,3-dimethanamine, trimethylhexaneethylenediamine and p-tert-butylphenol[16] | 12.0% |
| Additives | |
| • phenylaminopropyltrimethoxysilane coupling agent[17] | 8.0% |
| • lubricant textile agent based on fatty acid esters and surfactants[5] | 10.0% |

This composition has a viscosity of 56 cP at 20° C. (which corresponds to a viscosity of about 15 to 30 cP at the deposition temperature of about 40 to 60° C.). The filaments are then assembled into yarns, which are wound in the form of rovings. The yarns obtained have a yarn count of about 307 tex and a loss on ignition of 0.6%.

The yarns obtained are easy to manipulate and have a uniform coating over their entire length, polymerization (in the present case, this is a copolymerization) being carried out over about 36 h after mixing together the compositions on the filaments.

The abrasion resistance of the yarns is measured as in Example 2. For different yarns according to the present example, the amount of flock weighed is about 8 mg of flock per kg of yarn tested. This shows that the yarns obtained have good abrasion resistance.

The tensile breaking force and tenacity of the yarns obtained are also measured as in Example 2. The tensile breaking force measured is about 16 kgf (standard deviation of 0.9 kgf) and the tensile breaking tenacity is about 50 g/tex (standard deviation of 3 g/tex). These yarns allow organic materials to be reinforced effectively.

EXAMPLE 4

Filaments 14 microns in diameter, obtained by drawing molten glass streams, are coated with the following first stable composition (weight percentages relative to the mixture of the first and second compositions):
Components (first group) of the base system with a molecular mass of less than 750:

| • trimethylolpropane triglycidyl ether[18] | 30.0% |
| • diglycidyl ether of 1,4-butanediol[13] | 10.0% |
| • (C$_{12}$—C$_{14}$)alkyl monoglycidyl ether[14] | 10.0% |

This composition has a viscosity of 68 cP at 20° C. (which corresponds to a viscosity of about 20 to 40 cP at the deposition temperature of about 40 to 60° C.).

The filaments are then coated with the following second stable composition (weight percentages relative to the mixture of the first and second compositions):
Components (second group) of the base system with a molecular mass of less than 750:

| • trimethoxysilylpropylaminopropyltrimethoxysilane coupling agent[15] | 6.0% |
| • mixture of benzene-1,3-dimethanamine, trimethylhexaneethylenediamine and p-tert-butylphenol [16] | 12.0% |
| • N-aminoethylpiperazine | 10.0% |

-continued

| Catalyst: | |
| • 2-(4,6-dimethylaminomethyl)phenol[12] | 2.0% |
| Additives: | |
| • gamma-methacryloxypropyltrimethoxysilane coupling agent[6] | 12.0% |
| • lubricant textile agent based on mineral oil and surfactant[19] | 8.0% |

This composition has a viscosity of 36 cP at 20° C. (which corresponds to a viscosity of about 15 to 25 cP at the deposition temperature of about 40 to 60° C.). The filaments are assembled into yarns, which are wound in the form of rovings. The yarns obtained have a yarn count of about 300 tex and a loss on ignition of 0.6%.

The yarns obtained are easy to manipulate and have a uniform coating over their entire length, polymerization (in the present case, this is a copolymerization) being carried out over about 12 h after mixing together the compositions on the filaments.

The abrasion resistance of the yarns is measured as in Example 2. The amount of flock weighed is about 3 mg of flock per kg of yarn tested. This shows that the yarns obtained have good abrasion resistance.

The tensile breaking force and tenacity of the yarns obtained are also measured as in Example 2. The tensile breaking force measured is about 11 kgf (standard deviation of 0.8 kgf) and the tensile breaking tenacity is about 38 g/tex (standard deviation of 3 g/tex). These yarns allow organic materials to be reinforced effectively.

EXAMPLE 5

Filaments 14 microns in diameter, obtained by drawing molten glass streams, are coated with the following first stable composition (weight percentages relative to the mixture of the first and second compositions):
Components (first group) of the base system with a molecular mass of less than 750:

| • diglycidyl ether of 1,4-butanediol[13] | 40.0% |
| • (C$_{12}$—C$_{14}$)alkyl monoglycidyl ether[14] | 15.0% |

This composition has a viscosity of 40 cP at 20° C. (which corresponds to a viscosity of about 15 to 30 cP at the deposition temperature of about 40 to 60° C.).

The filaments are then coated with the following second stable composition (weight percentages relative to the mixture of the first and second compositions):
Components (second group) of the base system with a molecular mass of less than 750:

| • mixture of benzene-1,3-dimethanamine, trimethylhexaneethylenediamine and p-tert-butylphenol[16] | 10.0% |
| Catalyst: | |
| • 2-(4,6-dimethylaminomethyl)phenol[12] | 2.0% |
| Additives: | |
| • gamma-methacryloxypropyltrimethoxysilane coupling agent[6] | 19.0% |

| | |
|---|---|
| • lubricant textile agent based on mineral oil and surfactant[19] | 8.0 |
| • lubricant textile agent based on paraffinic derivatives and surfactants[20] | 6.0% |

This composition has a viscosity of 38 cP at 20° C. (which corresponds to a viscosity of about 25 to 35 cP at the deposition temperature of about 40 to 60° C.). The filaments are assembled into yarns, which are wound in the form of rovings. The yarns obtained have a yarn count of about 316 tex and a loss on ignition of 0.55%.

The yarns obtained are easy to manipulate and have a uniform coating over their entire length, polymerization (in the present case, this is a copolymerization) being carried out over about 48 h after mixing together the compositions on the filaments.

The abrasion resistance of the yarns is measured as in Example 2. The amount of flock weighed is about 0 mg of flock per kg of yarn tested. This shows that the yarns obtained have good abrasion resistance.

The tensile breaking force and tenacity of the yarns obtained are also measured as in Example 2. The tensile breaking force is about 14 kgf (standard deviation of 0.4 kgf) and the tensile breaking tenacity is about 42 g/tex (standard deviation of 1 g/tex). These yarns allow organic materials to be reinforced effectively.

Composite plates with parallel yarns are made from the yarns, in accordance with the standard NF 57152. The reinforced resin is a polyester resin. The mechanical properties presented by these plates, in terms of flexion and shear, are respectively measured according to ISO standards 178 and 4585, before maturation and after immersion of these plates in water at 98° C. for 24 h. The flexural breaking stress, for a glass content in the composite of about 69% by weight, is about 1256 MPa (standard deviation of 44 MPa) before maturation and about 785 MPa (standard deviation of 27 MPa) after maturation, the flexural breaking stress, for a glass content brought to 100% by weight, is about 2346 MPa (standard deviation of 82 MPa) before maturation and about 1465 MPa (standard deviation of 51 MPa) after maturation and the shear breaking stress, for a glass content in the composite of about 69% by weight, is about 67.5 MPa (standard deviation of 1.5 MPa) before maturation and about 33 MPa (standard deviation of 1 MPa) after maturation. Such mechanical properties are particularly good.

The glass yarns according to the invention can be used in various applications, for example in textile applications such as the manufacture of chains by warping, or directly in reinforcement applications such as the reinforcement of organic materials (for example plastics) or inorganic materials (for example cement materials in order to obtain composite products).

(1) Sold under the reference "HELOXY 5048" by the company Shell
(2) Sold under the reference "HELOXY 107" by the company Shell
(3) Sold under the reference "HELOXY 62" by the company Shell
(4) Sold under the reference "DY 071" by the company Ciba-Geigy
(5) Sold under the reference "NOPCOSTAT FT 504" by the company Henkel
(6) Sold under the reference "SILQUEST A 174" by the company OSi
(7) Sold under the reference "DYNASILAN IMEO" by the company Hüls
(8) Sold under the reference "LUCIDOL CH 50" by the company Akzo
(9) Sold under the reference "SILQUEST A 187" by the company OSi
(10) Sold under the reference "SR 454" by the company Cray-Valley
(11) Sold under the reference "HDDA" by the company U.C.B.
(12) Sold under the reference "ACTIRON NX 3" by the company Protex
(13) Sold under the reference "HELOXY 67" by the company Shell
(14) Sold under the reference "DY 0391" by the company Ciba-Geigy
(15) Sold under the reference "SILQUEST A 1170" by the company OSi
(16) Sold under the reference "ANCAMINE 2089 M" by the company Air Products
(17) Sold under the reference "SILQUEST Y 9669" by the company OSi
(18) Sold under the reference "DY0396" by the company Ciba-Geigy
(19) Sold under the reference "LUBRONYL GF" by the company Rhone-Poulenc Bevaloid
(20) Sold under the reference "ROCOLL 80" by the company Lamberti

What is claimed is:

1. A process for producing sized glass yarns, which comprises:
    a) drawing streams of molten glass from orifices located at a bottom of one or more dies, in the form of one or more fans of continuous filaments, and
    b) assembling the filaments into one or more yarns which are collected on one or more moving supports,
        wherein a first stable composition, having a viscosity of between 0.5 and 250 cP, is deposited onto the surface of the filaments, and at least a second stable composition, supplied separately from the first and having a viscosity of between 0.5 and 300 cP, is deposited onto the surface of the filaments or the yarns, at the earliest during the deposition of the first composition and at the latest during the collection of the yarns, the difference in viscosity between the two compositions deposited being less than 150 cP, the mixture of the compositions deposited functioning as a sizing composition and being polymerizable at room temperature.

2. The process according to claim 1, wherein the amount of each composition deposited is, excluding solvent, from 0.1 to 2% of the weight of the filaments.

3. The process according to claim 1, wherein the first composition is deposited on the filaments cooled to a temperature below 90° C.

4. The process according to claim 1, wherein the polymerization of the mixture takes place to an extent at least 80% in less than 80 hours after mixing the compositions together.

5. The process according to claim 1, wherein the second composition is deposited on the filaments at the latest during assembly of the filaments into yarns.

6. The process according to claim 1, wherein the ratio of the amounts by weight of the first and second compositions on the filaments or yarns is between 1/10 and 10.

7. The process according to claim 1, wherein each composition has a solvent content of less than 5% by weight.

8. The process according to claim 1, wherein the mixture comprises at least one base system which is polymerizable at room temperature, this base system comprising at least 60% by weight of components with a molecular mass of less than 750 and comprising at least one group of components capable of homopolymerizing at room temperature or at least two groups of components, or both, the components of the two groups being copolymerizable at room temperature.

9. The process according to claim 8, wherein the mixture of compositions further comprises, in addition to the base system, at least one initiator which promotes the polymerization of all or part of the components of the base system.

10. The process according to claim 8, wherein the base system comprises at least a first group of components which are homopolymerizable at room temperature and a second group of components which are homopolymerizable at room temperature, the mixture also comprising at least one initiator which promotes the homopolymerization of the components of the first group and at least a second initiator which promotes the homopolymerization of the components of the second group.

11. The process according to claim 8, wherein the base system comprises at least a first group of components and a second group of components which are copolymerizable at room temperature with the components of the first group.

12. The process according to claim 1, wherein the mixture comprises at least one coupling agent, the proportion of the coupling agents being between 0 and 25% by weight of the mixture.

13. The process according to claim 1, wherein the mixture comprises at least one film-forming agent, in an amount of between 0 and 10% by weight of the mixture.

14. The process according to claim 1, wherein the mixture comprises at least one lubricant textile agent, in an amount of between 0 and 25% by weight of the mixture.

15. A process for producing sized glass yarns, which comprises:
  a) drawing streams of molten glass from orifices located at a bottom of one or more dies, in the form of one or more fans of continuous filaments, and
  b) assembling the filaments into one or more yarns which are collected on one or more moving supports,
    wherein a first stable composition, having a viscosity between 0.5 and 250 cP, is deposited onto the surface of the filaments, and at least a second stable composition, supplied separately from the first and having a viscosity of between 0.5 and 300 cP, is deposited onto the surface of the filaments or the yarns after the deposition of the first composition and at the latest during the collection of the yarns, the difference in viscosity between the two compositions deposited being less than 150 cP, the mixture of the compositions deposited functioning as a sizing composition and being polymerizable at room temperature.

16. A glass yarn coated with a sizing composition comprising at least one base system which is polymerizable at room temperature, the base system comprising at least one group of components which are capable of homopolymerizing at room temperature or comprising at least two groups of components, the components of the two groups being copolymerizable at room temperature, or both.

17. A composite comprising at least one organic or inorganic material, or both, and sized glass yarns, which composite comprises, at least in part, the sized glass yarns according to claim 16.

* * * * *